United States Patent
Rindal (10) Patent No.: US 11,250,116 B2
(45) Date of Patent: Feb. 15, 2022

(54) OPTIMIZED PRIVATE BIOMETRIC MATCHING

(71) Applicant: Visa International Service Association, San Francisco, CA (US)

(72) Inventor: Peter Rindal, San Francisco, CA (US)

(73) Assignee: VISA INTERNATIONAL SERVICE ASSOCIATION, San Francisco, CA (US)

( * ) Notice: Subject to any disclaimer, the term of this patent is extended or adjusted under 35 U.S.C. 154(b) by 167 days.

(21) Appl. No.: 16/664,530

(22) Filed: Oct. 25, 2019

(65) Prior Publication Data

US 2021/0124815 A1 Apr. 29, 2021

(51) Int. Cl.
*G06F 21/32* (2013.01)
*H04L 9/32* (2006.01)
*H04L 9/08* (2006.01)

(52) U.S. Cl.
CPC ............ *G06F 21/32* (2013.01); *H04L 9/0825* (2013.01); *H04L 9/3231* (2013.01); *H04L 2209/56* (2013.01)

(58) Field of Classification Search
CPC ... G06F 21/32; G06F 21/6245; H04L 9/3231; H04L 9/0825; H04L 2209/56
See application file for complete search history.

(56) References Cited

U.S. PATENT DOCUMENTS

| | | | |
|---|---|---|---|
| 2009/0006855 A1* | 1/2009 | Tuyls | H04L 9/008 713/182 |
| 2015/0381349 A1* | 12/2015 | Nikolaenko | G09C 1/00 713/189 |
| 2018/0349585 A1* | 12/2018 | Ahn | H04L 63/0861 |

* cited by examiner

*Primary Examiner* — Alexander Lagor
(74) *Attorney, Agent, or Firm* — Loeb & Loeb LLP (57) ABSTRACT

A homomorphic encryption scheme, such as Paillier encryption in combination with a bit packing process allows biometric matching at a terminal without exposing a biometric template stored at a user's device. Because such encryption schemes are data intensive, the bit packing process allows reductions in data being sent and processed so that the biometric matching process can be accomplished in near real time. The high speed of this optimized process allows the technique to be applied to many real world processes such as access control and transaction processing.

19 Claims, 5 Drawing Sheets

OPTIMIZED PRIVATE BIOMETRIC MATCHING

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

The use of biometrics as a mechanism of authentication between devices or between a device and a person has been in use for some time. However, templates of a person's biometric data may be shared and subsequently stored by devices outside a person's control. Should one or more of those biometric templates be compromised by that third party device, that person may have no recovery path, since the person cannot generate new fingerprints, face scans, iris images, etc.

SUMMARY

In an embodiment, a biometric confirmation device may use a homomorphic encryption technique to compare a biometric template with a biometric scan to determine whether a match exists without actually disclosing the biometric template to the third party device. Further, the homomorphic process allows the terminal to send current biometric scan data to the terminal without leaking scan information. In order to optimize the encryption process, a term packing process allows a dramatic reduction in computing overhead during the verification stage.

BRIEF DESCRIPTION OF THE DRAWINGS

The figures depict a preferred embodiment for purposes of illustration only. One skilled in the art may readily recognize from the following discussion that alternative embodiments of the structures and methods illustrated herein may be employed without departing from the principles described herein.

DETAILED DESCRIPTION

A terminal may wish to confirm that a person is associated with a particular device, such as a smartphone. For example, a point of sale device (POS), such as at a retailer, may be capable of processing a transaction using a sight-unseen smartphone. That is, the POS may be able to complete a transaction using Wi-Fi or Bluetooth with a smartphone using the same protocol as would have been used if the smartphone was presented to the POS via Near Field Communication (NFC) by tapping the smartphone to the POS. However, the POS would first need to determine which smartphone in the vicinity is the one with the proper credential corresponding to the current purchase and purchaser.

The POS may send a request to nearby smartphones requesting biometric templates of images for their respective users. The POS may also capture an image of the user engaged in the current transaction. Once the POS finds a smartphone with the image biometric template of the user matching the image just captured, the transaction processing can proceed using a normal payment flow. That is, in an exemplary embodiment, the smartphone can establish a secure channel with the POS, the transaction data can be transferred and signed by the smartphone's payment application along with the personal account number (PAN) or token data related to the user's payment card. This information may be passed by the POS to the retailer's acquiring bank for approval and processing.

However, in this process, the POS should not simply be able to request biometric templates from every nearby smartphone simply so that matching the image to the correct user can be performed. This would expose the biometric data of every nearby smartphone user, including those devices/users who are not involved in the transaction in any way. Conversely, the image of the user or its biometric template, should not be shared with each nearby smartphone so that the user's information remains protected from unwanted distribution. The techniques for accomplishing this are discussed below. In this example, there is little or no threat of the smartphone attempting to spoof the POS into thinking it is someone else, because the payment is made via a separate purchase transaction using a different credential. This type of identification may be thought of as passive.

In a similar process for a different transaction type, for example, one involving receiving cash at an automated teller machine (ATM), the benefit of a deliberate attempt to deceive the identification process at the ATM could result in fraudulent receipt of funds. In this case, an active identification may be used to further identify the user. In this case, instead of just matching the biometric template, the user may provide a copy of the template signed by an authority that also includes user identity information. In this case, the approval process results in not only establishing a relationship between a user and a smartphone, but the user and the user's identity as previously established with the authority.

A homomorphic cryptography algorithm, such as a Paillier encryption among others, may be used. The basic premise is that an operation performed on encrypted data has the same result as that operation being performed on unencrypted data. As will be discussed in greater detail below, this allows verification operations to be performed on encrypted data so that while the matching process may occur on the terminal, the biometric template never leaves the smartphone.

While the advantages of such a process are apparent, homomorphic cryptographic algorithms, such as Paillier, can be very compute-intensive at certain phases of the process. For example, key generation and data encryption can be very time consuming, so long that including these steps in a normal cryptographic transaction, such as a purchase transaction may be prohibitive. The following description discloses an approach to address these shortcomings. Further, the homomorphic algorithms as applied to biometrics can yield datasets that are large enough to adversely affect transmission time between the user device and the terminal (for example, the POS or ATM). An embodiment described below for packing data reduces the data required for transmission by a factor of 8, although other reduction factors are possible. Bit masking of non-essential terms also helps to reduce the potential for data leakage during the data reduction process.

In an embodiment using current technology, the matching process takes about 300 milliseconds with an initial communication payload of 55 Mbytes of data and about 1 Mbyte for each communication after that.

Figure 1:
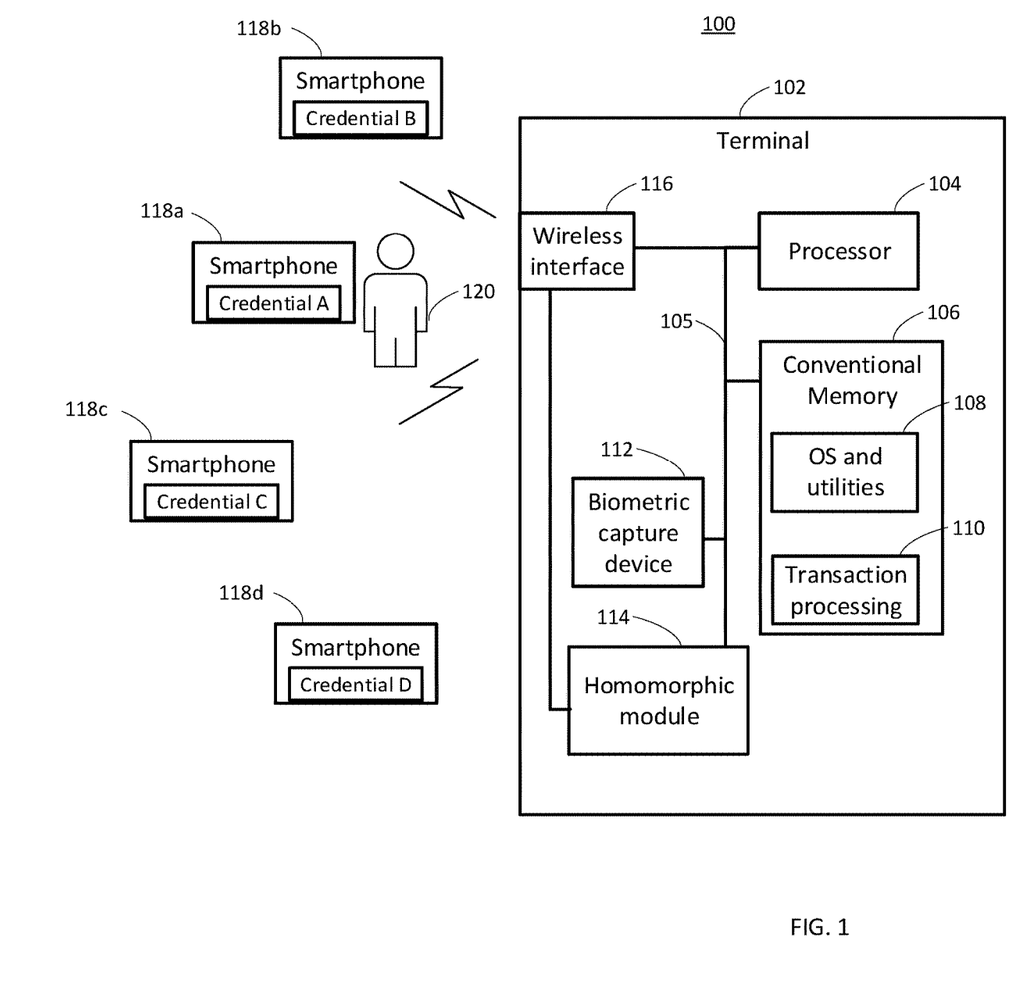
FIG. 1 is a system diagram illustrating elements for use in private biometric matching in accordance with the current disclosure.

FIG. 1 illustrates an exemplary system 100 that supports the homomorphic matching process. A terminal 102 may be a POS device, such as a register at a retailer, an ATM, or any other device for which a biometric authentication may be useful including access control, record keeping, or other personal transactions. The terminal 102 may include a processor 104 coupled by a data bus 105 to a memory 106, a biometric capture device 112, a cryptographic module 114 and a wireless interface 116. The memory 106 may include an operating system and utilities 108 used in the startup and basic operation of the terminal 102 including communication and user interface, as is known. A transaction processing module 110 may handle interactions between purchasers and/or payment instruments, bar code scanners or card acceptance devices, host systems, and acquirers.

The homomorphic module 114 may include cryptographic routines for encryption and decryption, as well as routines for generating templates from biometric data received from the biometric capture device 112. These data may include facial images, fingerprint scans, iris scans, retinal scans, palm outline data, voice prints, etc. More specific functions associated with the homomorphic module 114 are discussed below. The wireless interface 116 may include a Wi-Fi module, a Bluetooth module, or any wireless connection hardware and associated protocol that allows relatively high speed data communication between the terminal 102 and external entities.

The system 100 may also include or be coupled with a plurality of mobile devices such as smartphones 118a, 118b, 118c, and 118d. The mobile devices may also include laptops, tablets, wearable devices or other electronic gear capable of storing data and two-way communication.

In operation, a user 120 may approach the terminal 102 to complete a transaction. The terminal 102 may wish to determine which, if any, of the smartphones 118 in the vicinity are associated with the user. Several different scenarios for this process are discussed with the help of FIGS. 2-5.

Figure 2:
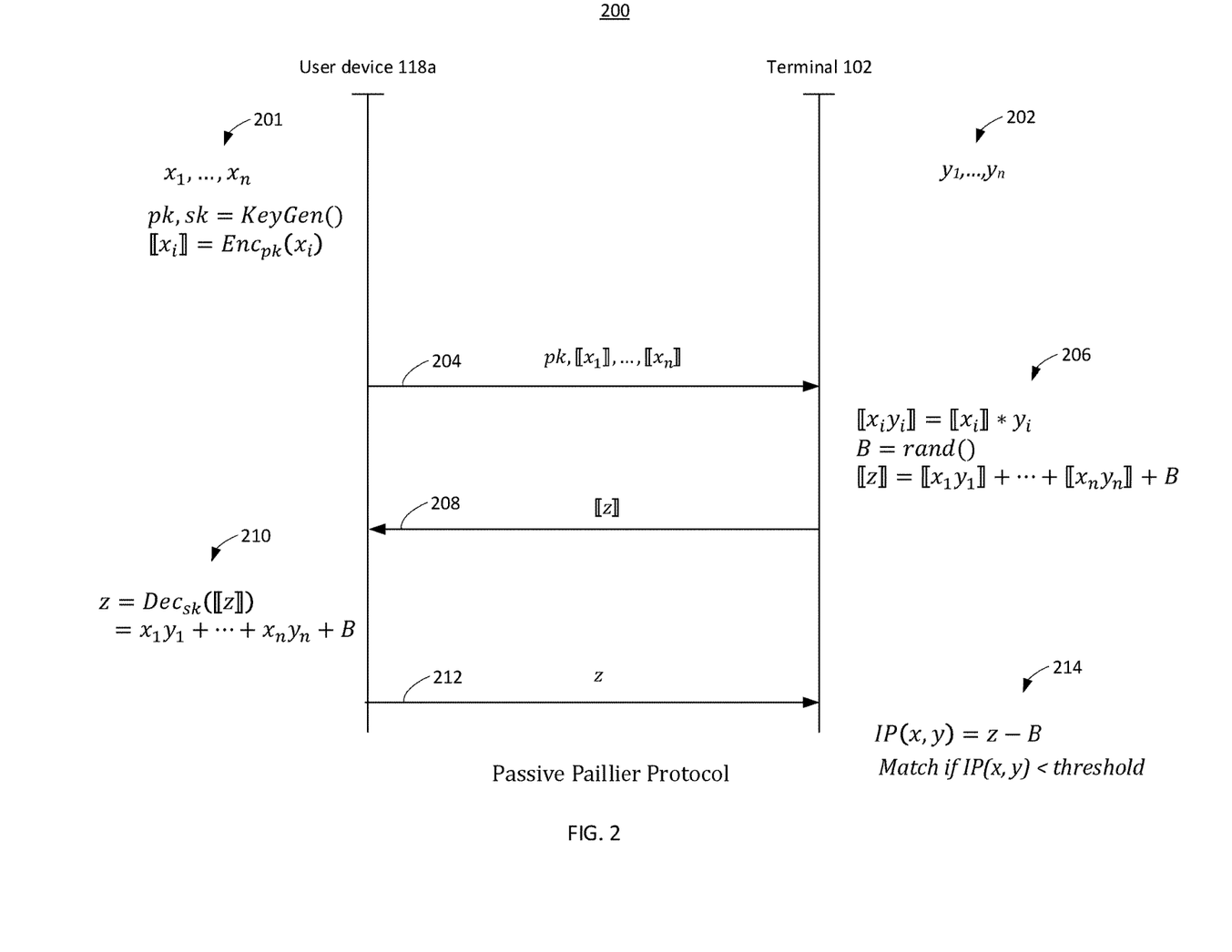
FIG. 2 is a bounce diagram illustrating a first technique for private biometric matching.

Turning to FIG. 2, an interaction 200 that only identifies the device, that is, a passive transaction, is shown. At step 201, the user device 118a may generate an asymmetric key pair pk, sk (public key and secret key). This may be done one time only at any time prior to the transaction. A biometric x may be collected and stored as a series of data $x_1$-$x_n$, also referred to as a biometric template, or more simply, a template. The template may be encrypted into a set of values represented by $[[x_n]]$. The collection, generation, and encryption of the biometric data may also be done only one time prior to its use. As the key generation, template generation, and encryption are the most compute-intensive steps associated with the use of Paillier (homomorphic) encryption, the one-time pre-computing of these data may be performed when the device is inactive, saving time during a transaction.

At step 202, at the beginning of a potential transaction, the terminal 102 may collect a biometric measurement, such as an image, of the user 120 and use the raw data to generate a template y. Because the terminal 102 may have fewer limitations than the mobile device including access to power and a larger processor, the generation of the template via a neural network may be performed virtually in real time. In other embodiments, the terminal 102 and a mobile device may begin this initial step before the transaction is even initiated, such as when the user enters a store. Step 202 may continue by requesting a template match from surrounding mobile devices 118a, 118b, 118c, 118d. While the following process may be repeated for each mobile device, only a single response is followed for the sake of clarity and simplicity.

In response to the request, the smartphone's public key and the encrypted template may be sent to the terminal 102 at step 204. At block 206, the terminal 102 may multiply each term of the encrypted template with the corresponding term of the local template. As discussed more below, a characteristic of Paillier encryption or other additive homomorphic encryption schemes is that operations performed on encrypted data yield the same result as the same operation on unencrypted data.

At this point, the terminal has no information about the user's biometric template, other than that it exists. If the terminal 102 returns the result matrix z, that is, the inner product of x and y, to the device 118a, the device 118a may be able to determine the template taken at the terminal. To avoid leaking this information to the device 118a, the terminal 102 may add a random number, B, to the result of the operation. With the addition of the random value, the device 118a cannot discover any information about the template from the terminal 102.

The encrypted value z which includes the added value B, is sent at step 208 from the terminal 102 to the device 118a. There, at step 210, the device 118a may decrypt the z to reveal the plaintext value z. The decryption process is much more efficient than the encryption process, so the device 118a can perform the decryption in a timely manner compared to expected transaction processing time. Further, the data transferred at step 208 (and at step 212 below) is significantly smaller than the original transfer at block 204. This helps to speed the process.

This value may be returned at step 212 to the terminal 102. By subtracting the value B from z, the inner product of x and y can be developed. If this inner product is less than a threshold value, or in the case of cosine similarity match, close enough to a value of 1, the match is confirmed. As discussed above, since the biometric match is not actually used to complete the transaction, this passive technique is usable. The match merely confirms that the payment credentials on the device 118a can be used to make the payment. If the device 118a were to take steps to spoof or deceive the terminal 102 into thinking it is someone else, the result would simply be that the device 118a completes the payment transaction, perhaps for goods or services that in the end are taken by another user. In other words, there is no incentive to deceive in this scenario.

Figure 3:
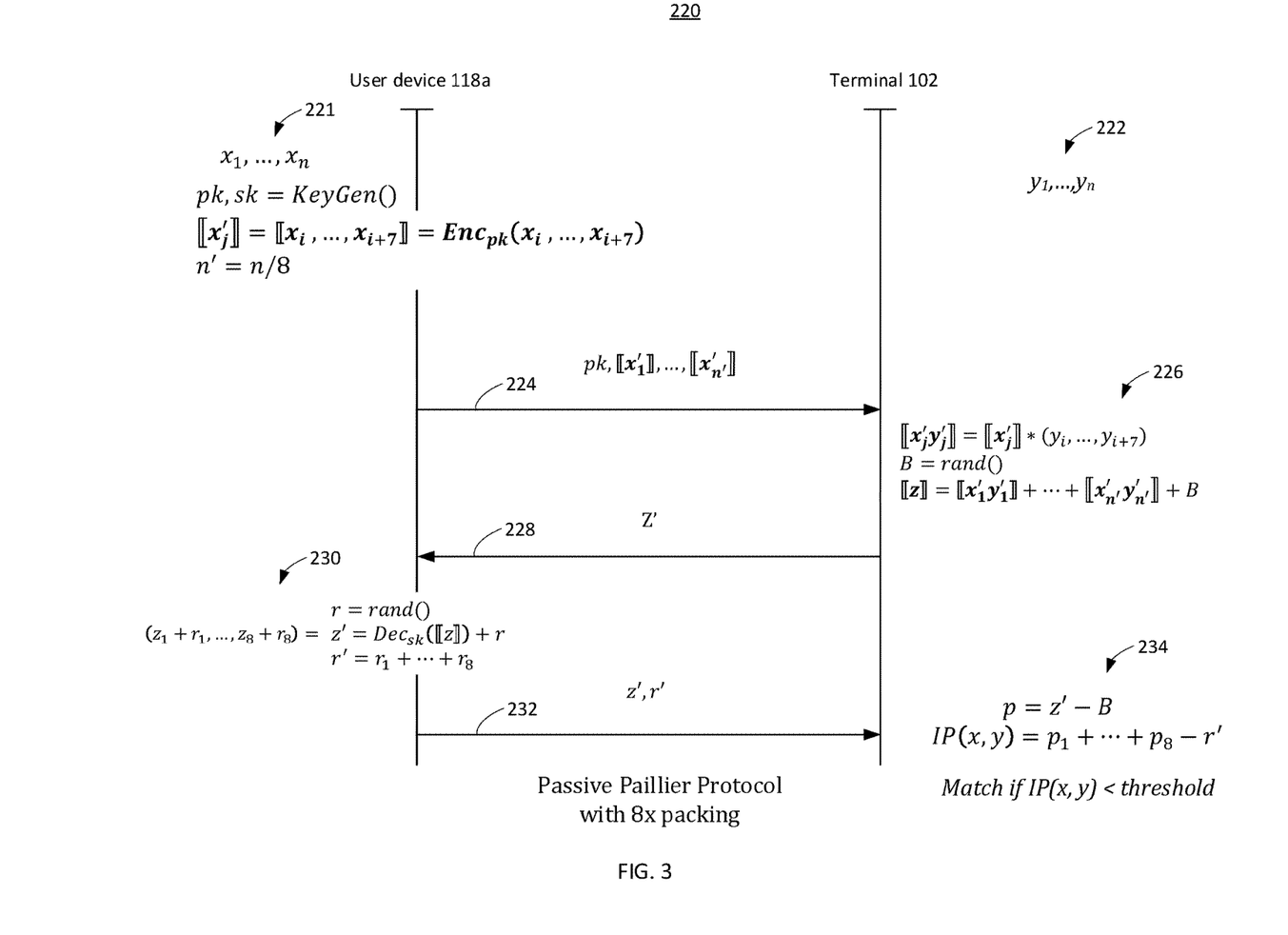
FIG. 3 is a bounce diagram illustrating a modification of the technique illustrated in FIG. 2.

While the size of the data sent in the example of FIG. 2 may be manageable, FIG. 3 illustrates a packing technique for reducing the data size of at least the initial data transfer by a factor of up to eight. While larger and smaller size reductions are possible, for current system configurations the factor of eight may provide an optimized balance between processing time and data transmission time. At step 221, similar to the previous example, the device 118a may collect biometric data and generate the key pair. In this case, only every eighth value of the template may be encrypted. In various embodiments, the value of the number of skips may be a function of the level of encryption (key size). This is discussed more below.

The new encrypted vector, $[[x'_j]]$, may therefore be, in this example, eight times smaller than the similar encrypted value of the example of FIG. 2. The value may be sent to the terminal at step 224 responsive to a request following generation of the template at step 222. At step 226, the terminal 102 will perform a similar grouping of the terms $(y_i, \ldots, y_{i+7})$ to yield $y'_j$. The respective groupings are multiplied together and the resultant value sent back to the device 118a at step 228.

At step 230, a random value grouping $r=(r_0, \ldots r_7)$ may be generated and added to the decrypted values to prevent overflows, as discussed in more detail below. The decrypted grouping z' and value $r'=r_0+\ldots+r_7$ may be returned to the terminal at step 232. At step 234, the value p is the difference between z' and B, while the inner product is the sum of the terms less r'.

Figure 4:
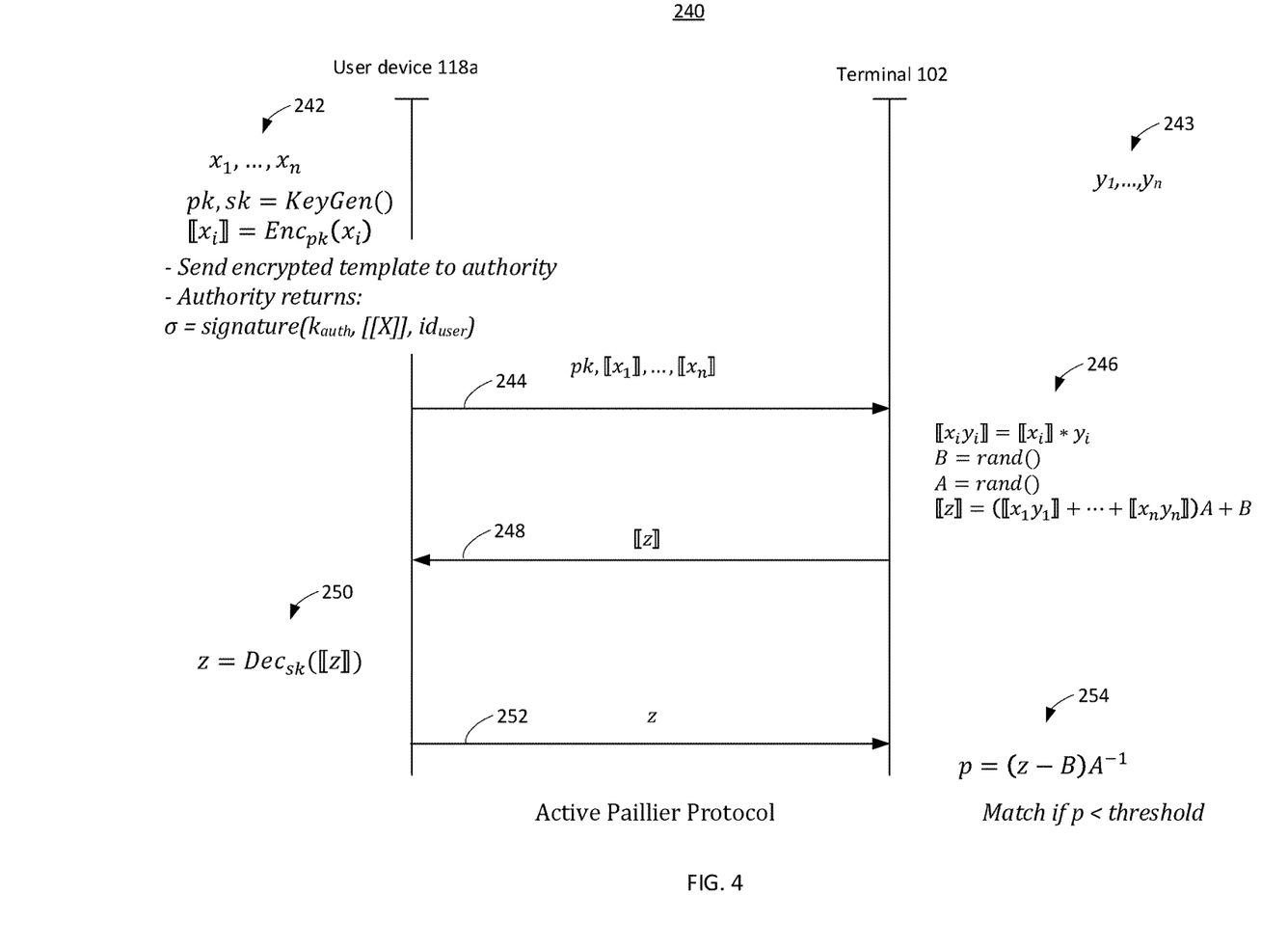
FIG. 4 is a bounce diagram illustrating another technique for private biometric matching.

FIG. 4 illustrates a process 240 that illustrates the case where the user/device 118a may be highly incentivized to deceive the terminal 102, such as when making a withdrawal at an ATM. In this case, the device 118a may register the encrypted template with an authority, such as a financial institution, to bind the encrypted template, an authority key, and an identity of the user 120 in a signed object σ. After step 242, step 243 and step 244 follow as above. Step 246 not only performs the operation on the local template and the received encrypted template and adds the value B but also multiplies the result of the operation by a second random value A.

As above, the value z is sent to the device 118a at step 248. At step 250, the private key, sk, is used to decrypt the value z, which is returned to the terminal 102 at step 252. At step 254, the value B is subtracted from z and the result divided by A to determine the inner product value.

Figure 5:
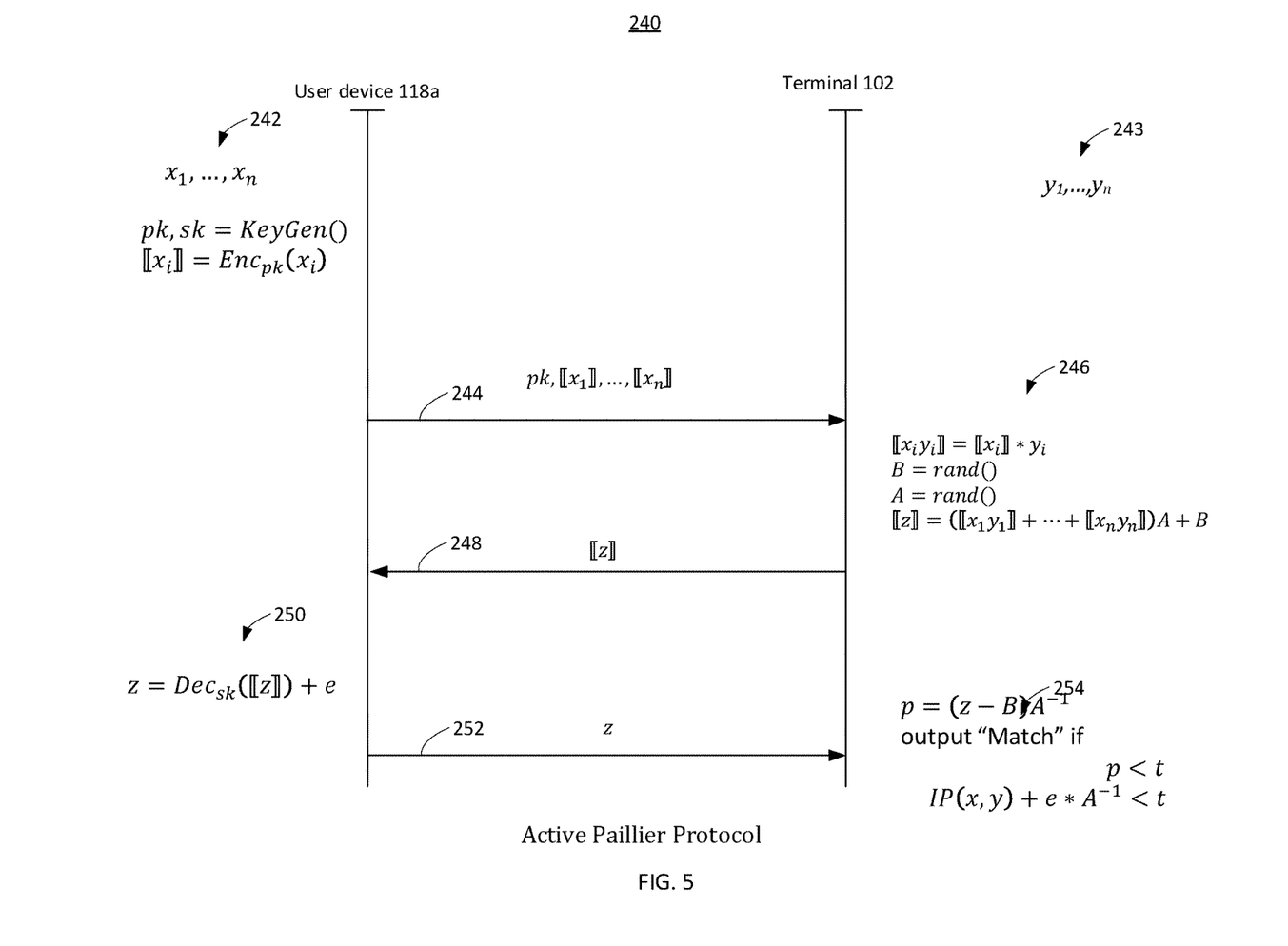
FIG. 5 is a bounce diagram illustrating another aspect of the technique of FIG. 4.

FIG. 5 illustrates the process 240 of FIG. 3 showing the effect of the value A when the device 118a attempts to deceive the terminal 102 into thinking there is a match. At step 250, the device 118a may attempt to add (or subtract) a value e to the resulting decryption value so that the terminal 102 will reach an incorrect conclusion about the value. However, the value of A may be selected so that any attempt to alter the value z will result in the returned z+e term, when multiplied by $A^{-1}$ will be well above the threshold value t due to the plaintext space of the being large. The use of modulus math ensures that even though the terminal 102 does not know the value of e, any attempt to alter the returned value will be detectable.

Once the match is made, for example, at FIG. 4, the user identifier from the encrypted token may be extracted using the authority public key. This essentially creates a two-factor authentication, the first being the match of the biometric and the second being the possession of the token/object σ.

The following describes details of the encryption and padding processes.

1 Introduction

Our goal is to enable a card holder's phone to store their biometric data/template r and to securely enable an untrusted payment terminal to determine if a biometric measurement taken by it matches the template v. For various reasons this must happen without revealing v to the terminal or the measurement to the phone. The communication channel will be Bluetooth or Wi-Fi. The current protocol implementation achieves this in roughly 0.3 seconds with 55 MB of communication for one comparison and 1 MB of communication for each comparison after that.

1.1 Biometrics

The field of biometric authentication is quite well explored under some use case. For facial and fingerprint biometrics, many of the most of effective methods follow a similar framework which build on machine learning and neural networks. Beforehand, given many raw biometric measurements (e.g. photos of people's faces or fingerprint scans) a neural network can be trained to "embed" a new biometric measurement into the vector space $\mathbb{R}^n$ such that two embeddings can easily be compared to determine if they are from the same source, i.e. person. In particular, we will consider the embedding where the "comparison" function is the cosine similarity function. The function outputs a value in $[-1, 1]$ which is proportional to the angle between two vectors in $\mathbb{R}^n$. That is, when two embedding have a small angle between them they are considered a match. More specifically, for a threshold $t \in (0,1]$ we say that two embeddings u, $v \in \mathbb{R}^n$ match each other if $$t \le \text{CosineSim}(u, v)$$
$$= \frac{u \cdot v}{\|u\|_2 \|v\|_2}$$
$$= \frac{\sum_i u_i v_i}{\sqrt{\sum_i u_i^2} \sqrt{\sum_i v_i^2}}$$
$$= \cos(\ominus)$$

Putting it together, let NeuralNet be the trained neural network which outputs embeddings. The two measurements $m_1$, $m_2$ are said to be a match if $$t < \text{Cosine Sim}(\text{NeuralNet}(m_i), \text{NeuralNet}(m_2))$$

For the remainder of the paper we will refer to these embeddings in $\mathbb{R}^n$ as a biometric template.

1.2 Setting

Broadly speaking, our goal is to allow a user to authenticate to terminal (e.g. Visa card terminal, ATM) using their biometric data. From a pure functionality point of view we wish the terminal to take a measurement (e.g. photo) m* of the user/customer, and then should learn if there exists a pre-registered measurement muser of a user that matches, i.e. learn user such that $$t < \text{Cosine Sim}(\text{NeuralNet}(m^*), \text{NeuralNet}(m_{user}))$$

A naive solution to this problem is to maintain a large database containing the measurement $m_{user}$ for each user. When a terminal takes a measurement m* of the customer, the terminal sends m* to a central server which computes if a matching $m_{user}$ exists. One issue is that comparing all $m_{user}$ against m* could be expensive due to having many users. Secondly, the threshold t would have to be very strict to ensure that $m_{user}$ is unique. This could lead to a bad user experience due to the increased probability of rejecting valid customer measurements (photos). Finally, Visa does not wish to maintain a database of user biometric data due to privacy concerns and the risk of leaking this data during a security breach. For example, a rouge terminal could simply start asking the central server if a random/probable template v is contained in the database and the matching user ID if it exists.

1.3 Homomorphic Encryption

The solution we build relies on techniques known as (additively) homomorphic encryption. Classical encryption allows an entity to sample a random key k and then encrypt data as $c=\text{Enc}_k(m)$. We will also use the notation that $[\![m]\!]=\text{Enc}_k(m)$ to denote that $m \in \mathbb{Z}$ is encrypted under some key. Homomorphic encryption extends this idea to allow an entity with $[\![m_1]\!]$, $[\![m_2]\!]$ to "add" the ciphertexts to get a ciphertext of the underlying values added together. That is $$[\![m_1]\!] + [\![m_2]\!] = [\![m_1+m_2]\!]$$

The ability to add two ciphertexts means that the encryption scheme is additively homomorphic. The computation of $m_1+m_2$ is performed modulo some integer p. An example of such a scheme is known as Paillier encryption. Additively homomorphic encryption also has the property that you can multiply a ciphertext $[\![m_1]\!]$ with a plaintext $m_2$ by performing repeated additions. That is $$[\![m_1]\!] * m_2 = \sum_{i=1}^{m_2} [\![m_1]\!] = [\![m_1 m_2]\!]$$

Some encryption are multiplicatively homomorphic which means ciphertexts can be multiplied together. That is $$[\![m_1]\!] * [\![m_2]\!] = [\![m_1 m_2]\!]$$

For example, ElGamal encryption is multiplicatively homomorphic. If a scheme is both additive and multiplicatively homomorphic then it is called a fully homomorphic encryption scheme.

Unless otherwise stated, the protocols here are only required to be additively homomorphic. Therefore fully homomorphic encryptions schemes would also be compatible with our protocols.

2 Overview

This solution takes a different approach by having the user store their biometric data $m_{user}$ on their own phone. This approach has the advantage that the overall collection of data has no single point of failure. Moreover, storing biometric data only on the phone follows the existing FIDO standard. A breach of the central server or even a phone does not reveal the biometric data of all users.

We consider several entities for this application. A user with their mobile device and pre-registered biometric measurement $m_{user}$. This user is running a banking app that will perform the following protocol(s). A central server will help in the authentication but will never store plain biometric data. Finally, a terminal which the user will interact with. This terminal can be in communication with both parties and trusts the server to be honest. Once set up, the terminal should not need to talk to the server to authenticate a user. The terminal is equipped with a biometric reader (e.g. fingerprint read or camera).

The overall flow of the protocol is given in FIG. 1. In a registration phase the user encrypts their biometric data and sends it to the server. The biometric data is then tied to the user's identity using cryptographic methods (e.g. a signature) to generate a payment/identity token. This token is returned to the user and is only valid for this user and in the context of a biometric payment with this exact encrypted template.

In the comparison phase the terminal will set up channels with nearby devices/users (e.g. over Bluetooth or Wi-Fi) and run the comparison protocol with each of them. The terminal has one (or more) measurement and wishes to identify which of the users have registered a matching biometric. Each user will begin by sending their token $\sigma_{user}$ and encrypted template $[\![u']\!]$ to the terminal.

When the terminal takes a measurement $m_i^*$, it first computes the template $v_i$=NeuralNet($m_i$) and normalizes it as $v_i'=v_i/\|v_i\|_2$. It is then the case that Cosine Sim(u,$v_i$)= $\Sigma_j u_j' v_{i,j}'$. Using additively homomorphic encryption, an encryption of Cosine Sim(u,$v_i$) can be computed by the terminal as $[\![\text{Cosine Sim}(u,v_i)]\!] = \Sigma_j [\![u_j']\!] v_{i,j}'$. This encryption can then be sent to the user to be decrypted. However, this would reveal the result to the user instead of the terminal. This is rectified by having the terminal one-time mask the result with a random value $r_i$ as $[\![x_i]\!]=r_i+\Sigma_j [\![u_j']\!] v_{i,j}'$. The user decrypts and sends back xi which allows the terminal to compute Cosine Sim(u,$v_i$)=$x_i+r_i$.

This protocol has several notable improvements over a "standard" approach to solving this program. First is that this protocol is optimized for the case where the user's template is fixed and will be compared with server measurements $m_1^*, \ldots, m_\ell^*$. In particular, the user only sends the large vector $[\![u']\!]$ once which is used to compute the $\ell$ small results $[\![x_1]\!], \ldots, [\![x_\ell]\!]$. This greatly improves the efficiency of the protocol for the intended use case.

For example, when a user walks into a store, their device can send ($\sigma_{user}$, $[\![u']\!]$) to the terminal. This will consist of the bulk of the communication between the devices and the terminal, e.g. 55 KB. This message is large due to $[\![u']\!]$ being the vector of roughly n=512 elements. Later, when the terminal takes a measurement $m_i^*$, they can compute the single element $[\![x_i]\!]$, which is n times smaller than $[\![u']\!]$, and send this to the user device. Not only does this decrease overall communication by allowing the terminal to reuse $[\![u']\!]$, it also decreases latency due to $[\![u']\!]$ being sent before a measurement has ever been taken. In practice with the use of Paillier encryption, sending $[\![u']\!]$ currently requires roughly 55 KB of communication while $[\![x_i]\!]$ and $x_i$ combined require less than 1 KB.

The second advantage of this approach is that the user only generates the encryption $[\![u']\!]$ once during the registration phase. This is of particular concern due to Paillier encryption being somewhat inefficient while computation and decryption is more efficient. For example, encrypting u'

---

Figure I: Overview of the bask protocol.

[Registration] A protocol between the user and server.
(a) The user captures their raw biometric data $m_{user}$, e.g. a photo of their face.
(b) The user computes their biometric template u = NeuralNet($m_{user}$).
(c) The user generates an encryption key pair (sk, pk) and computes the encryption $[\![u_i']\!]$ = $\text{Enc}_{pk}(u_i/\|u\|_2)$.
(d) The user sends $[\![u']\!]$ to the server which generates an identity token $\sigma_{user}$ = $\text{Token}_k(\text{user}, [\![u']\!])$ and returns $\sigma_{user}$ to the user.
[Compare] A protocol between the user and terminal. The terminal has $\ell$ measurements $m_1^*, \ldots, m\ell^*$. The terminal will learn which $m_i^*$ match $m_{user}$.
(a) The user sends the terminal ($\sigma_{user}, [\![u']\!]$) who checks that they are "valid".
(b) For each i ∈ [$\ell$], the terminal computes $v_i$ = NeuralNet($m_i^*$) and $v_i'$ = $v_i/\|v_i\|_2$.

Figure I: Overview of the bask protocol.

(c) For each i ∈ [ℓ], the terminal computes ⟦$x_i$⟧ = $r_i$ + $\Sigma_j$⟦$u_j$⟧$v_{i,j}'$ where $r_i$ is a random value. Note $x_i$ = CosineSim(u, $v_i$) + $r_i$.
(d) The terminal sends (⟦$x_1$⟧, ..., ⟦$x_j$⟧) to the user which decrypts and returns ($x_1$, ..., $xℓ$).
(e) For each i ∈ [ℓ], the terminal compute CosineSim(u, $v_i$) = $x_i$ − $r_i$. If CosineSim(u, $v_i$) ≥ t then let $\tau_i$ = $\sigma_{user}$ and ⊥ otherwise.
(f) The terminal outputs ($\tau_1$, ..., $\tau ℓ$).

can require many seconds while the rest of the protocol requires much less than a single second. As such, if the user had to freshly encrypt u' for each measurement, then the use of Paillier encryption could be prohibitively inefficient/power intensive for the practicality of this application.

An advantage of this approach over comparing the measure $m_i^*$ with a central database containing all registered measurements $m_{user}$ is that the terminal can significantly narrow down the search to only the measurements of nearby users. For example, there could be 20 nearby users while the total number of users could be a hundred million or more. This could allow us to set the threshold t to be much more relaxed and decrease the probability of rejecting a pair of matching measurements.

3 Batching & Paillier Encryption

We now introduce a new optimization for Paillier encryption which reduces the communication overhead of the bask protocol by roughly 4 to 8 times. Paillier is additively homomorphic with a plaintext space $\mathbb{Z}_{pq}$ where p, q are large primes. Typical sizes of p, q is 1024 bits each which means that a single Paillier ciphertext can contain 2048 bits of plaintext data. The security level would then be similar to RSA with a 2048 bit key. In the biometric application we must encrypt a vector u=($u_1$, ..., $u_n$). The standard method for doing this to encrypt each $u_i$ on its own to give you $n$ ciphertexts ⟦$u_1$⟧, ..., ⟦$u_n$⟧. However, this is very wasteful since each element $u_i'$ can typically be represented using at most 32 bits while a ciphertext is large enough to hold 2048 bits. The size of a Paillier ciphertext cannot be made smaller due to security constraints.

3.1 Encoding

A method known as packing has long been known to allow you to encode several values into a ciphertext. The idea is that you place multiple elements into a single ciphertext with zero padding between them. For example, the packing of $u_1$, ..., $u_n \in \mathbb{Z}_{2^m}$ can be computed as $u^* = \Sigma_{i=1}^{n} 2^{(i-1)(m+d)} u_i \in \mathbb{Z}_{n(m+d)}$ where d is the number of padding bits between each element. Given two such packed values, $u^*$, $v^*$, adding them results in $$⟦m_1⟧ * m_2 = \sum_{i=1}^{m_2} ⟦m_1⟧ = ⟦m_1 m_2⟧$$

i.e. the addition of each element in the encoded format. The $d$ padding bits are used here to ensure that if $u_i + v_i$ generates a carry bit, i.e. $u_i + v_i \geq 2m$, then this carry will be stored in the padding bits. In this case $d = 1$ would be sufficient. More generally, this approach works so long as no position ever requires more than m'=m+d bits to be represented.

This encoding also works when multiplying a single value $x \in \mathbb{Z}_{2^m}$ with the encoded vector $v^*$. In particular, $$xv^* = \sum_{i=1}^{n} 2^{(i-1)m'}(xv_i)$$

Again we require $d$ to be large enough to make sure $xv_i$ can be represented with m'=m+$d$ bits. In this case d=m would be sufficient. However, multiplying two vectors component-wise (Hadamard Product) does not work in this format. For example, if we have n=2 then $$v^* u^* = 2^{0m'} v_1 u_1 + 2^{1m'}(v_1 u_2 + v_2 u_1) + 2^{2m'} v_2 u_2$$

Although we do not get $2^{0m'} v_1 u_1 + 2^{m'} v_2 u_2$ as desired, observe that the values of interest ($v_1 u_1$, $v_2 u_2$) are stored in the result just with $v_2 u_2$ at a different positions than in the input. We call this it's "level 2" position. It is easy to verify that for any n, $$v^* u^* = v_1 u_1 + 2^{m'}(\ldots) + 2^{2m'}(\ldots) + \ldots + 2^{(2n-2)m'} v_n u_n$$

$v_1 u_1$ and $u_n u_n$ can be recovered but the other (...) terms will consist of various cross terms between $u_i$ and $v_j$. We now show a new encoding strategy which allows us to recover all of the product terms $v_i u_i$ from various positions $v^* u^*$. Let n=3 and let us now encode $u_1$, ..., $u_n$ as $$u^* = u_1 + 2^{m'} u_2 + 2^{3m'} u_3$$

Note that the position for $2^{2m'}$ is set to zero. If we then multiply $v^* u^*$ using these encodings we obtain $$v_1 u_1 + 2^{m'}(v_1 u_2 + v_2 u_1) + 2^{2m'} v_2 u_2 + 2^{3m'}(v_1 u_3 + v_3 u_1) + 2^{4m'}(v_2 u_3 + v_3 u_2) + 2^{5m'}(0) + 2^{6m'} v_3 u_3.$$

The "level 2" positions here are 0, 2, 6, i.e. the first bit of each $v_i u_i$ starts at bit index 0, 2m', 6m'. Then general ideal can be extended for an arbitrary value of n. In particular, given a suitable encoding for vectors of n−1 elements, an encoding for n elements can be performed by adding $2^{n'm'} u_n$ to the existing encoding where n' is the smallest integer such that no previous element is encoded at position n' and the new cross terms introduced do not collide with previous output positions. For example with n=3 then n'=3 instead of 2 (the next available input position) because the output position for $v_2 u_2$ would have been obscured with the cross terms ($v_1 u_3 + v_3 + u_1$). Define I index these values such that $$u^* = \Sigma_i 2^{m' I[i]} u_i$$

is the encoding.

For this encoding strategy, we must additionally ensure the d is sufficiently large such that any overflow from any of the cross terms does not exceed m'=m+d bits.

3.2 Masking

One issue with the encoding strategy is that if we reveal $v^* u^*$ to a party, then they will learn $\{v_1 u_1 | i \in [n]\}$ and the value of all of the other positions. For example, with n=2 learning v*u* also reveals $v_1u_2+v_2u_1$ which is undesirable. This issue is overcome by adding an additional random value to each of these position. When encoding a vector, we now make every slot of size m'+λ bits, i.e.

$$u^* = \sum_{i=1}^{n} 2^{I[i](m'+\lambda)} u_i$$

and when we decrypt/reveal v*u* we now reveal $$x = v^* u^* + \sum_{i \in I} 2^{i(m'+\lambda)} r_i$$

instead where $r_i$ is uniform value in $\mathbb{Z}_{2^{m'+\lambda}}$ and I indexes the positions with the cross terms we wish to hide. To ensure that adding the $r_i$ terms do not corrupt the other positions, we require that the addition between the cross terms and $r_i$ does not overflow the m'+λ bits of the position. Recall that we guarantee that m' is large enough to hold the cross terms. Therefore the probability of an overflow is that probability that the top λ bits of $r_i$ is all ones. This happens with probability $2^{-\lambda}$ which can be made arbitrarily small so that the overall error probability is acceptable.

3.3 Signed Values

Signed values can also be supported. This is achieved by using a twos complement encoding of the values. Given an m bit signed value, encode it as a twos complement 2m bit number[1]. This requirement for this expansion is to ensure that after multiplying two of these values, the first 2m bits of the product. One security ramification of this approach is that we must extend the masking approach described above to hide the top 2m bits of the 4m bit product. If these bits were not masked then when the product is reveal the decrypted could distinguish multiply two positive values and two negative values which both result in the same logical value, i.e. the product of negative numbers would have at least one 1 in the top 2m bits while the other would not.

[1] Actually, this must be sign extended to the size of the final result in bits (when not twos complement encoded). For inner products this could be as large as 2m+log₂n bits. See below.

Regardless, these top 2m bits can be masked in a straight-forward extension of the masking technique described above.

3.4 Inner Product

Up to this point we have only discussed computing component wise multiplication. However, we desire computing inner product. The high level ideal is as follows where we are encoding 8 values per ciphertext.

1. Each Party Computes Several Encodings
  (a) $u_1^*, \ldots, u_\ell^* = E(u_1, \ldots, u_8), \ldots, E(u_{n-7}, \ldots, u_n)$
  (b) $v_1^*, \ldots, v_\ell^* = E(v_1, \ldots, v_8), \ldots, E(v_{n-7}, \ldots, v_n)$ 2. The user encrypts ⟦$\mathcal{U}_1^*$⟧, ..., ⟦$\mathcal{U}_\ell^*$⟧ and sends them to the terminal.

3. The terminal computes ⟦$Z^*$⟧ = $\sum_i$⟦$u_i^*$⟧ $v_i^*$ + B=⟦$\sum_i u_i^* v_i^*$ + B⟧ and sends it to the user.

4. The user decrypts $Z^*$ and compute $s^* = Z^* + r^*$ where $r^*$ is an encoding at "level 2" of the random values r1, ..., $r_8 \in \mathbb{Z}_{2^{m'}}$ and m' is the number of "unmasked" bits at each position. The user sends s* and $r' = \sum_i r_i$ mod $2^{m'}$.

5. The terminal computes $x^* = x^* - B$ and decodes it to $x_1, \ldots, x_8$ and computes $\sum_i u_i \, v_i = \sum_i x_i - r'$.

Additional care here must betaken to ensure that enough padding bits are placed between each value to guarantee that no overflows will happens. This can be done simply by computing the maximum value any position can take.

As an optimization, if a priori it is known that any that the inner product will not exceed some given value then fewer padding bits may be needed. This is the case of cosine similarity where the inner product can Ia* at most 1 (times some scaling factor) while each product $u_iv_i$ can also be at most 1. This observation can be used to prove that $\log_2$ n fewer padding bits are needed. This is contrasted with the case where the only constraint is that $u_iv_i$ can be at most 1 which would imply that the inner product could be as large as n.

Fully Homomorphic Encryption (FHE) can be used in a similar way as Paillier encryption. It is actually more computationally efficient but requires an increase in communication overhead. With careful optimization this added overhead may be minimized. An advantage of FHE is that it could be used to give stronger guarantees that the user's encrypted template $\mathcal{U}_1, \ldots, \mathcal{U}_n$ is of correct form. Further investigations are required.

A technical effect of the current concept is that a user's biometric template never leaves the user's possession even though the matching process occurs at the terminal device at which the user is requesting authentication. This is a technical solution to a technology problem, that of preserving the integrity of a person's biometric data from compromise during the act of using that biometric with a foreign and unknown device. Similarly, the process ensures that a terminal device capturing a person's biometric data will not leak that data to other devices while attempting to discover the correct device with which to interact.

Further, the bit packing process disclosed overcomes previous carry bit problems to allow significant data reductions in the size of data transferred between devices, resulting in significant speed improvements.

A system and method in accordance with the current disclosure benefits both users and merchants. The biometric matching may occur with little or no interaction from the user 120, and the transaction accomplished so that the user does not even need to remove his or her device 118a from a purse or pocket. This streamlines the interaction while reducing the inconvenience and threat posed by removing the device 118a from a purse or pocket. More importantly, the biometric matching occurs without the terminal 102 or any other server from even temporarily handling the user's biometric template. That information is stored solely on the user's device 118a. The terminal 102 may gather biometric data directly from the user for the period of the transaction but without the means to register that information, that template has little to no value. As a rule, a merchant does not want to be responsible for that kind of user data in the event of a breach and will systematically discard such information after a transaction.

The figures depict preferred embodiments for purposes of illustration only. One skilled in the art will readily recognize from the following discussion that alternative embodiments of the structures and methods illustrated herein may be employed without departing from the principles described herein.

Upon reading this disclosure, those of skill in the art will appreciate still additional alternative structural and functional designs for the systems and methods described herein through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the systems and methods disclosed herein without departing from the spirit and scope defined in any appended claims.

I claim:

1. A computer implemented method for authenticating a first device of a user to a second device, the method comprising:
   receiving a ciphertext and a public key of a public/private key pair from a first device, wherein the ciphertext is created by:
      obtaining, using one or more sensors of the first device, a first biometric measurement of the user;
      sending the first biometric measurement to a neural network to compute a first vector of biometric values to include in a first biometric template for the user;
      adding, to the first biometric template, a plurality of packing values to create a packed biometric template; and
      encrypting the packed biometric template using homomorphic encryption to create the ciphertext;
   obtaining, using one or more sensors of the second device, a second biometric measurement of the user;
   computing an encrypted similarity metric using a cosine similarity function to compare the ciphertext and a second biometric template including the second biometric measurement;
   computing an encrypted code by adding a masking value to the encrypted similarity metric to create a masked similarity metric and encrypting the masked similarity metric using homomorphic encryption via the public key;
   sending the encrypted code to the first device, wherein the first device decrypts the encrypted code using a private key of the public/private key pair resulting in a decrypted code;
   receiving, from the first device, the decrypted code;
   computing a comparison metric by subtracting the masking value from the decrypted code;
   comparing the comparison metric to a threshold value; and
   providing access to a resource when the comparison metric is less than the threshold value.

2. The method of claim 1, wherein the first biometric measurement is a picture of the user's face.

3. The method of claim 1, wherein the ciphertext is saved in a memory of the first device.

4. The method of claim 1, wherein the second biometric measurement is a picture of the user's face.

5. The method of claim 1, wherein the second biometric template includes a second vector of biometric values.

6. The method of claim 5, wherein preparing the second biometric template comprises:
   sending the second biometric measurement of the user to a neural network to compute the second vector of biometric values.

7. The method of claim 1, wherein the plurality of packing values comprises eight values.

8. The method of claim 1, wherein the ciphertext is sent to the second device over a communications network.

9. The method of claim 8, wherein the communications network is a Wi-Fi network or a Bluetooth enabled network.

10. A computer implemented method for authenticating a first device of a user to a second device, the method comprising:
    receiving a ciphertext and a public key of a public/private key pair from a first device, wherein the ciphertext is created by encrypting a first biometric template using homomorphic encryption;
    obtaining, using one or more sensors of the second device, a second biometric measurement of the user;
    computing an encrypted similarity metric using a cosine similarity function to compare the ciphertext and a second biometric template including the second biometric measurement;
    computing an encrypted code by:
       multiplying the encrypted similarity metric by a first masking value to create a first masked similarity metric;
       adding a second masking value to the first masked similarity metric to create a second masked similarity metric; and
       encrypting the first and second masked similarity metrics using homomorphic encryption via the public key;
    sending the encrypted code to the first device, wherein the first device decrypts the encrypted code using the private key of the public/private key pair resulting in a decrypted code;
    receiving, from the first device, the decrypted code;
    computing a comparison metric by subtracting the second masking value from the decrypted code to create a result and dividing the result by the first masking value;
    comparing the comparison metric to a threshold value; and,
    providing access to a resource when the comparison metric is less than the threshold value.

11. The method of claim 10, wherein the first biometric template includes a first vector of biometric values.

12. The method of claim 11, wherein the first vector of biometric values is obtained using one or more sensors of the first device to obtain a first biometric measurement of the user, wherein the first biometric measurement of the user is sent to a neural network to compute the first vector of biometric values.

13. The method of claim 12, wherein the first biometric measurement is a picture of the user's face.

14. The method of claim 10, wherein the ciphertext is saved in a memory of the first device.

15. The method of claim 10, wherein the second biometric measurement is a picture of the user's face.

16. The method of claim 10, wherein the second biometric template includes a second vector of biometric values.

17. The method of claim 10, wherein the ciphertext is sent to the second device over a communications network.

18. The method of claim 17, wherein the communications network is a Wi-Fi network or a Bluetooth enabled network.

19. The method of claim 18, wherein the first masking value is a 2000 bit number.

* * * * *